United States Patent
Webber

(10) Patent No.: US 10,360,038 B2
(45) Date of Patent: *Jul. 23, 2019

(54) METHOD AND APPARATUS FOR SCHEDULING THE ISSUE OF INSTRUCTIONS IN A MULTITHREADED PROCESSOR

(71) Applicant: MIPS Tech, LLC, Santa Clara, CA (US)

(72) Inventor: Andrew Webber, Hertfordshire (GB)

(73) Assignee: MIPS Tech, LLC, Campbell, CA (US)

( * ) Notice: Subject to any disclaimer, the term of this patent is extended or adjusted under 35 U.S.C. 154(b) by 535 days.

This patent is subject to a terminal disclaimer.

(21) Appl. No.: 14/930,913

(22) Filed: Nov. 3, 2015

(65) Prior Publication Data

US 2016/0055002 A1    Feb. 25, 2016

Related U.S. Application Data

(63) Continuation of application No. 12/584,759, filed on Sep. 11, 2009, now Pat. No. 9,189,241.

(30) Foreign Application Priority Data

Apr. 28, 2009    (GB) .................................. 0907286.9

(51) Int. Cl.
*G06F 9/38* (2018.01)
*G06F 9/30* (2018.01)
*G06F 9/48* (2006.01)

(52) U.S. Cl.
CPC ........ *G06F 9/3842* (2013.01); *G06F 9/30145* (2013.01); *G06F 9/3851* (2013.01); *G06F 9/4843* (2013.01)

(58) Field of Classification Search
CPC ..... G06F 9/46; G06F 9/30; G06F 9/00; G06F 9/38
See application file for complete search history.

(56) References Cited

U.S. PATENT DOCUMENTS 7,254,697 B2    8/2007  Bishop et al.
2001/0056456 A1 * 12/2001  Cota-Robles ......... G06F 9/3851
                                                                          718/103

(Continued)

OTHER PUBLICATIONS

Stuart Fiske and William J. Daily, Thread Prioritization: A Thread Scheduling Mechanism for Multiple-Context Parallel Processors, Jan. 1995, First IEEE Symposium on High-Performance Computer Architecture, 1995. Proceedings., pp. 1-12.*

(Continued)

*Primary Examiner* — Hugo Molina
(74) *Attorney, Agent, or Firm* — Adams Intellex, PLC

(57) ABSTRACT

A method to dynamically determine which instructions from a plurality of available instructions to issue in each clock cycle in a multithreaded processor capable of issuing a plurality of instructions in each clock cycle, comprises the steps of: determining a highest priority instruction from the plurality of available instructions; determining the compatibility of the highest priority instruction with each of the remaining available instructions; and issuing the highest priority instruction together with other instructions compatible with the highest priority instruction in the same clock cycle; wherein the highest priority instruction cannot be a speculative instruction. The effect of this is that speculative instructions are only ever issued together with at least one non-speculative instruction.

10 Claims, 5 Drawing Sheets

(56) References Cited

U.S. PATENT DOCUMENTS

| | | | | |
|---|---|---|---|---|
| 2004/0168045 A1* | 8/2004 | Morris | ................... | G06F 9/383 |
| | | | | 712/225 |
| 2004/0225870 A1 | 11/2004 | Srinivasan et al. | | |
| 2005/0060518 A1 | 3/2005 | Augsburg et al. | | |
| 2006/0101241 A1 | 5/2006 | Curran et al. | | |
| 2006/0136915 A1 | 6/2006 | Aingaran et al. | | |
| 2006/0184946 A1 | 8/2006 | Bishop et al. | | |
| 2007/0294693 A1* | 12/2007 | Barham | ............... | G06F 9/4881 |
| | | | | 718/102 |

OTHER PUBLICATIONS

An Evaluation of Speculative Instruction Execution on Simultaneous Multithreaded Processors, Swanson et al., University of Washington, Mar. 28, 2004, pp. 1-24. (Year: 2004).*
Nov. 21, 2016 Examination Report issued in European Patent Application No. 10717728.9.

* cited by examiner

METHOD AND APPARATUS FOR SCHEDULING THE ISSUE OF INSTRUCTIONS IN A MULTITHREADED PROCESSOR

FIELD OF THE INVENTION

The invention relates to a method and apparatus for dynamically optimising the issue of instructions in a multi-threaded microprocessor. Specifically, the invention relates to the issuing of speculative instructions in a multithreaded microprocessor which is capable of issuing instructions from more than one thread in each clock cycle.

BACKGROUND OF THE INVENTION

A multi-threaded processor is a microprocessor with execution units, caches and memories, etc. as per any other processor, but that additionally incorporates the concept of multiple threads of execution. A thread of execution consists of a stream of instructions acting upon the resources of the microprocessor, some of which are private to that specific thread and some of which may be shared between threads. Resources include registers, bandwidth and space in the cache or memories. FIG. 1 is a schematic illustration of a multithreaded microprocessor core, known in the art. In a multithreaded processor core as shown in FIG. 1, a number of threads 2 can operate in parallel, subject to their ability to issue instructions via the thread instruction scheduler 1. The threads may be given a priority order to allow the scheduler to determine which instructions to issue first.

It is possible for the processor to issue instructions from multiple threads in the same clock cycle provided that they do not use the same resources, such as the same data cache 3, at the same time. The scheduler must be configured to determine which instructions can be issued together in each clock cycle.

Speculative instructions are a particular type of instruction. The concept of speculative instruction fetching and issue is well understood in the field of microprocessors. Speculative instruction fetch and issue takes the form of making a prediction of the outcome of an earlier program instruction and then fetching and issuing instructions based on that prediction before it is known whether the prediction was correctly made. The most common example of an action to predict the outcome is of a branch in a program, where a choice is made as to what code path to take based on a conditional test. Other examples include return predictions and jump predictions. If it is later determined that the prediction was correct, the processor continues. If it is determined that the prediction was incorrect, then it is necessary to delete the predicted instructions and their side effects, and restart the instruction fetch and issue from the newly determined instruction fetch address.

The term speculative is used because the processor needs to act in advance of knowing the outcome of any recently issued instructions. For example, a branch may well follow immediately after a compare or condition testing instruction. In a pipelined processor the pipeline may be many stages long and the result of the condition test typically produces a result a long way down the pipeline. However, branches directly affect instruction fetch and will therefore have an impact right at the start of the pipeline. This leads to a bubble or stall as the branch has to wait for the condition test result to be known, and the alternative to this wait is to guess which branch is likely to be taken and take that guess as the route to follow until it is known whether the guess was right or wrong. The instructions fetched and/or issued between guessing and knowing the correctness of that guess are not necessarily correct and may have to be unwound—hence the term speculative. Guesses are either made based upon simple rules (e.g. backwards branches taken, forwards branches not taken) or historical data that indicates what a given section of code did most commonly in the past.

As used herein, the term "speculative instruction" means an instruction fetched and/or issued that may not be necessary, because the outcome of an earlier program instruction is not yet known.

The present invention deals with the problem of how to schedule the issue of speculative instructions in a processor that can issue instructions from multiple threads in the same clock cycle.

SUMMARY OF THE INVENTION

According to a first aspect of the invention, there is provided a method to dynamically determine which instructions from a plurality of available instructions to issue in each clock cycle in a multithreaded processor capable of issuing a plurality of instructions in each clock cycle, comprising the steps of:
  determining a highest priority instruction from the plurality of available instructions;
  determining the compatibility of the highest priority instruction with each of the remaining available instructions; and
  issuing the highest priority instruction together with other instructions compatible with the highest priority instruction in the same clock cycle;
  wherein the highest priority instruction cannot be a speculative instruction.

The effect of this is that speculative instructions are only ever issued together with at least one non-speculative instruction.

According to a second aspect of the invention, there is provided a system for issuing instructions in a multithreaded processor capable of issuing a plurality of instructions in each clock cycle, comprising:
  means for determining a highest priority instruction from the plurality of available instructions;
  means for determining the compatibility of the highest priority instruction with each of the remaining available instructions; and
  means for issuing the highest priority instruction together with other instructions compatible with the highest priority instruction in the same clock cycle;
  wherein the highest priority instruction cannot be a speculative instruction.

Preferred embodiments of the present invention address the problem of efficient scheduling of speculative instructions in a multithreaded microprocessor capable of issuing instructions from a plurality of threads on each clock cycle.

This and other aspects of the invention are defined in the appended claims, to which reference should now be made.

BRIEF DESCRIPTION OF THE DRAWINGS

There now follows a detailed description of a preferred embodiment of the invention, which is provided by way of example with reference to the accompanying drawings, in which.

DETAILED DESCRIPTION

Figure 1:
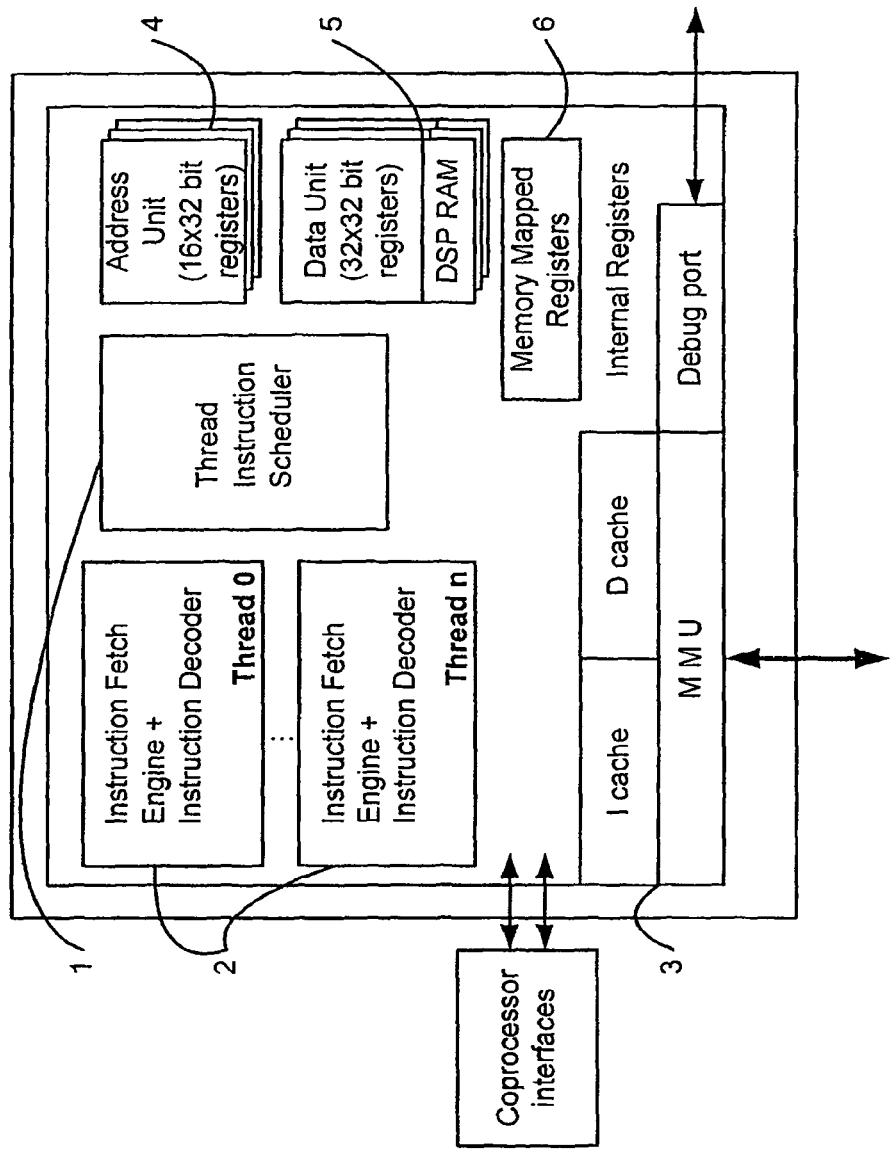
FIG. 1 illustrates a multithreaded processor core.

FIG. 1 is a schematic illustration of a multithreaded microprocessor. The microprocessor supports a plurality of threads that operate in parallel, subject to their ability to issue instructions via the instruction scheduler 1. In this system, different threads may issue instructions simultaneously provided that they are not attempting to use the same resources at the same time. The resources used by thread instructions include arithmetic units 4, 5, the cache subsystem 3, including instruction cache and data cache, and the coprocessors. In addition, the system may include small quantities of on-chip random access memory (RAM) that can be accessed instead of the cache subsystem based upon a simple address mapping. Systems may incorporate instruction RAM as well as data RAM.

The microprocessor includes a number of pipelines or execution units that operate in parallel. If one thread is issuing instructions to one pipeline, it is possible to allow other threads to issue instructions to other pipelines on the same clock cycle. In order to do this, instructions from multiple threads have to be available to the scheduler at each clock cycle and the scheduler must be able to prevent any conflicting resource requirements.

Figure 2:
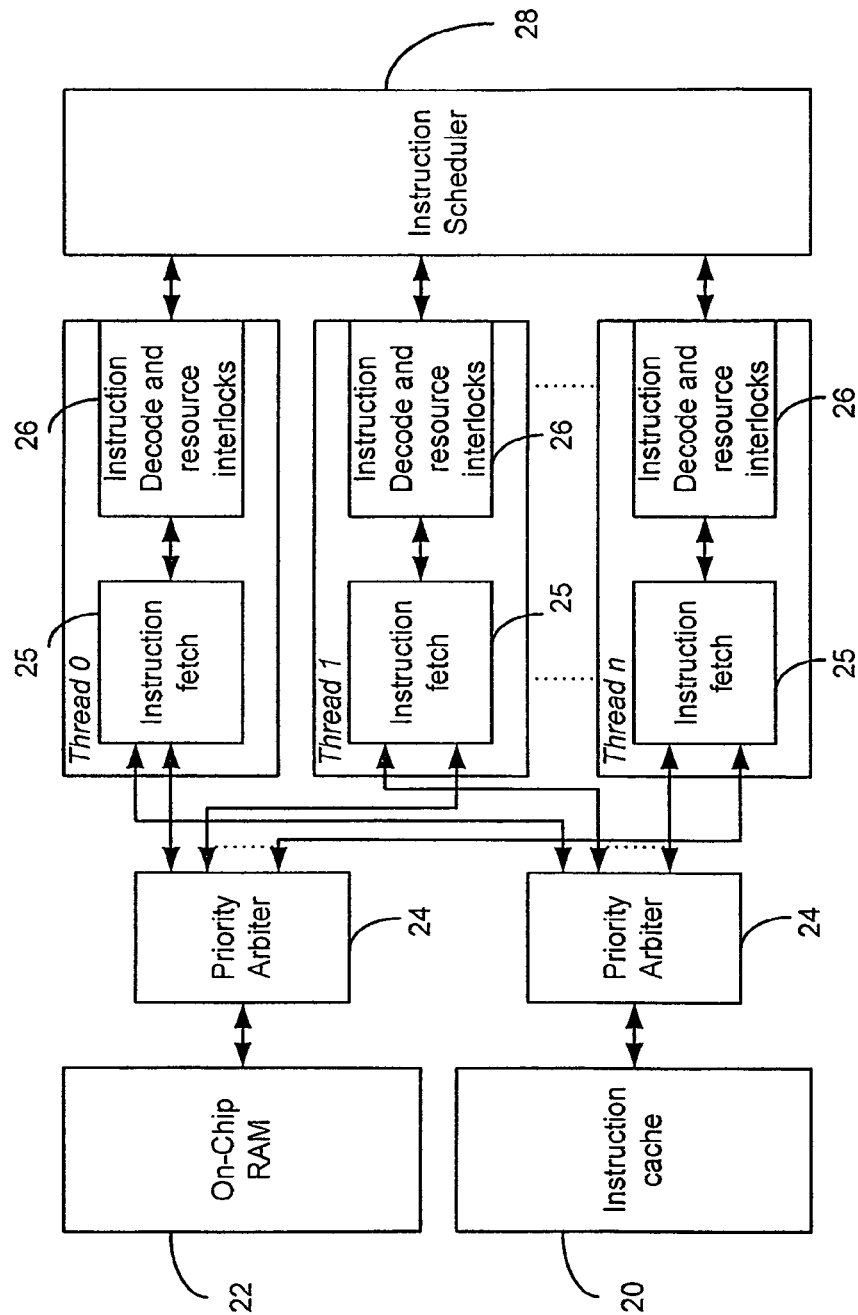
FIG. 2 illustrates an instruction fetch subsystem suitable for use in a system in accordance with the present invention.

FIG. 2 illustrates the elements involved in fetching instructions in order that instructions from a plurality of threads are available to the scheduler every clock cycle. This sub-system is described in co-pending application GB0802314.5. In the embodiment illustrated in FIG. 2, there are two main sources of instruction data—the instruction cache 20 and the on chip RAM 22. To optimize performance, both sources may be accessed at the same time (although each thread will only access one or the other, never both). Having two sources of instruction data enables up to two instructions for two different threads to be obtained per cycle.

In order to determine which thread is to access instructions from either the instruction cache 20 or the on chip RAM 22, each source of instructions has a priority arbiter 24 coupled between it and the instruction fetch units 25 for each of the threads.

Each priority arbiter is coupled to an instruction fetch unit 25 for each of the threads (thread 0 to thread n). Via this connection, the priority arbiter can receive requests for instructions with associated prioritisation data and can provide fetched instructions to an instruction fetch unit 25.

Each instruction fetch unit 25 includes an instruction buffer which can hold up to eight instructions in readiness to feed to an instruction decoder and resource interlocking unit 26 before issuing the instruction to an instruction scheduler 28 which will pass each instruction in turn to a processor for execution.

Having obtained instructions for multiple threads the instruction scheduler 28 may then be in a position to issue those instructions for multiple threads on the same cycle.

In order for the instruction scheduler 28 to be able to issue instructions from multiple threads in the same clock cycle, it needs to test the resources required by each thread's instruction against those needed for other instructions. This then ensures that conflicting instructions do not issue at the same time. This can be managed by the instruction decode unit 26 performing pre-decode of each instruction as it comes out of the corresponding instruction fetch unit 25 and then ANDing the stated resources required for this instruction against those determined in parallel for all the other threads active in the device.

A reduced set of these resource requirements may be tested. Picking a simple example, a thread may wish to use an execution unit to send a request for a data memory fetch to load or store some data. If another thread wishes to use either the same execution unit or wishes to use the data memory port for the data memory fetch, then it will be incompatible with execution of the first thread such that the two cannot be issued at the same time. If, however, another thread wishes to perform a set of different instructions such as a program branch which does not require those resources, it will be deemed to be compatible and may be issued for execution at the same time as a thread is used to request a data memory fetch.

In order to make an appropriate determination, all of the threads present have all of their stated resource requirements tested against each other in parallel. This process is symmetrical, in that if a thread A is compatible with a thread B then by definition thread B will also be compatible with thread A. Therefore, the test only needs to be made once between each pair of threads. As a result of this compatibility testing, a flag is generated for each pairing of threads and the status of this flag is determines whether or not threads are compatible. Therefore, the result of testing each thread against all other threads is that for each pair of threads a compatibility flag is generated, the status of which determines whether or not threads are compatible for execution, i.e. whether or not only two threads overlapping resource requirements at the same time.

In order to determine which instructions to then issue, each thread is given a priority ranking. The priority ranking may be based on any suitable metric, such as the automatic MIPS allocation (AMA) metric described in EP1639554. The thread with the highest priority ranking that is not prevented from issuing instructions due to register or resource interlocks, is then chosen as the thread to issue. Any other threads that are found not to require the same resources may be grouped with the instruction from the highest priority thread that is free to issue (called the lead instruction) into a set of instructions to be issued on that clock cycle. Instructions may be added to the set in priority order subject to their compatibility with instructions already included in the set.

The determination of the resources required by each instruction is carried out by an instruction pre-decode operation in the instruction decode unit 26. The decode unit 26 produces a short summary of the resources required by each instruction. The instruction scheduler then tests the resource requirements against other threads for inter-thread compatibility and against machine state for resource and register availability. The scheduler combines the results of these tests with the priority ranking to provide final sets of instructions to schedule on any given cycle.

The concept of 'speculation' is well understood within the art. This takes the form of making a prediction and then issuing instructions based upon that prediction before it can be known whether that prediction was made correctly. The most common example of an action to predict the outcome of an instruction is a branch where a choice is made as to what code path to take based upon a conditional test.

Speculation only applies for short periods, after which the outcome of the instruction is known and normal scheduling can resume.

In accordance with an aspect of the present invention, instructions that are speculatively executed do not use the normal thread instruction prioritisation rules described above. They should not use these rules because it is not known at the point of issue whether the speculation is correct or not. An alternative to using the normal prioritisation rules is to give these threads the minimum priority. However, this can lead to a number of design challenges. Therefore the preferred arrangement is that speculatively executed instructions should have no opportunity to issue except when paired with another thread.

A preferred example of the invention consists of a multi-threaded microprocessor with two or more threads (specifically 2, 3 or 4 threads). Each thread in the microprocessor possesses its own program counter (PC) which in turn is used to control instruction fetch for that thread, such that every thread has a piece of hardware to fetch instructions from instruction memory or an instruction cache. It is possible for every thread to have its own instruction memory or instruction cache as well. However, this requires each thread to be built with the resources it needs regardless of whether a thread in a system needs less memory than other threads in the same system. This is undesirable. A preferable strategy is to share the instruction memories and instruction cache between all of the threads and arbitrate between them for the right to access that memory or cache.

Because each thread has a certain amount of hardware specific to its own instruction fetch, it is possible to augment that hardware to make predictions as to the flow of instructions. In the first instance, for example, the prediction hardware could watch for branch instructions in the instruction stream being sent to issue and predict whether that branch would be taken or not. Thereafter, the instruction fetch could change the fetch pattern based upon that prediction (e.g. taking or not taking a branch). At this stage it is possible for the system to be configured such that instruction fetch waits until the outcome of the branch itself (at issue) can be determined and then feeds further instructions or restarts the fetch at the corrected location. Predicted instruction fetch of this nature is shown in FIG. 3.

Figure 3:
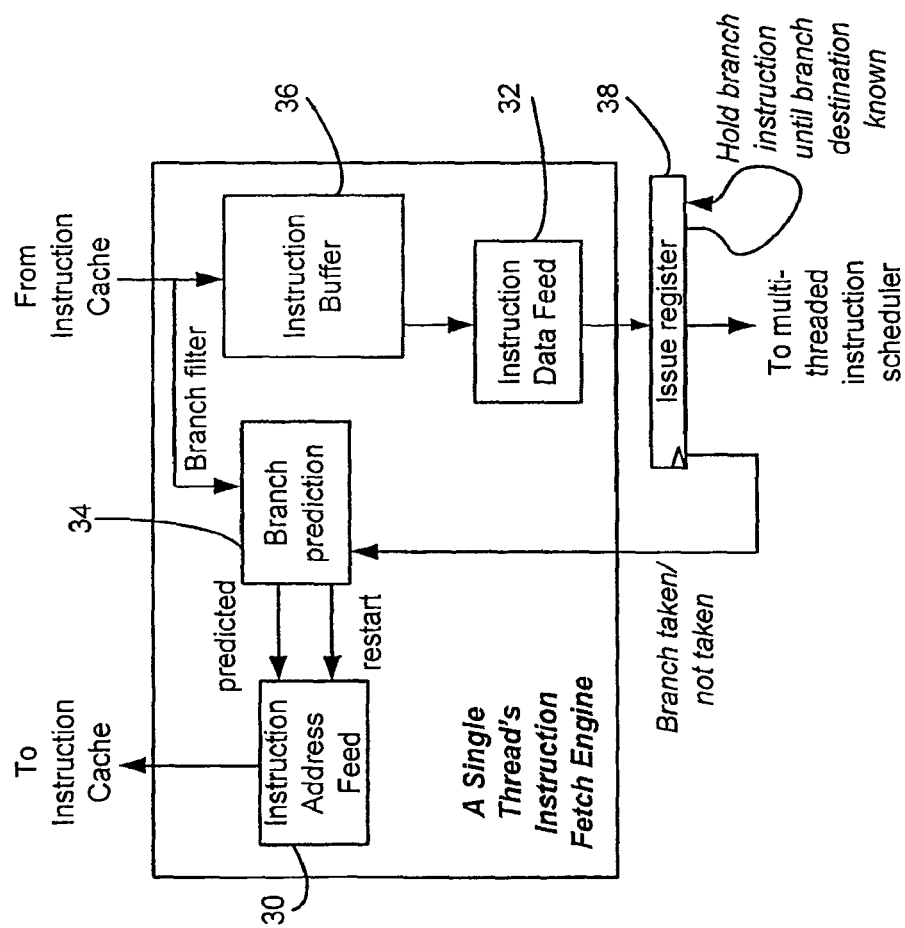
FIG. 3 illustrates a system for speculative instruction fetching.

As can be seen from FIG. 3, the instruction fetch system for each thread consists of a state machine 30 to generate new requests ('address feed') and a state machine 32 to feed instructions to the thread and its instruction scheduler ('data feed'). State machine 32 includes the functionality of the instruction pre-decode and resource interlocks tests 26 of FIG. 2. Also, shown in FIG. 3 is a branch filter and prediction unit 34 that picks out branch instructions from the returning fetch data and which can update the address feed as to where to be reading instructions from based upon predictions of where those branches will go.

In non-multithreaded microprocessors, the instruction fetch pipeline could be stalled if the consumption of instructions was less than the maximum rate of request. However, in multithreaded systems, where the instruction cache is shared between the threads, such stalling is not usually possible because it would introduce a dependency between threads such that a thread that has requested a number of instructions but not used them might then stall all the other threads in the system. Therefore, each thread instruction fetch unit incorporates an instruction buffer able to hold the returning data for a fixed number of instruction requests. As many instruction requests may be in transit as there are slots in the instruction buffer may be stored. The instruction buffer is shown as block 36. From the instruction buffer, instructions pass via an instruction data feed unit 32 to the instruction scheduler.

In this system predictions can be made based upon simple rules such as the direction of the branch (forwards or backwards) or using some form of abridged history as to which route was taken for this branch in the past. The actual issue of the branch instruction at the issue register 38 is held up until such time as the outcome is known (i.e. the predicates such as condition testing can be determined). Once the outcome can be determined the branch can be issued and then the flow of instructions can either pick up the predicted fetch data or cause the instruction fetch to restart with the correct instruction address.

Such a system is useful for hiding some of the latency involved in taking branches. However, it does have the significant limitation that there may always be stalls introduced while waiting to determine the result of the branch condition test.

An improvement upon this system is to issue the predicted instructions before the outcome of the branch, and therefore the correctness of the branch prediction, has been determined. In this case the instructions issued immediately after the branch are speculatively executed (as at the point of issue it is unknown whether the branch prediction was correct or not). As the branch outcome is calculated in the processor pipeline it will eventually become apparent whether the prediction was made correctly or not. When predictions are made correctly the issue of instructions ceases to be speculative and the thread may carry on as normal. When predictions are found to have been incorrectly predicted it is then necessary to delete the instructions issued after the branch and their side-effects and restart the instruction fetch from the newly determined instruction fetch address. This speculative instruction fetch and issue is shown in FIG. 4.

Figure 4:
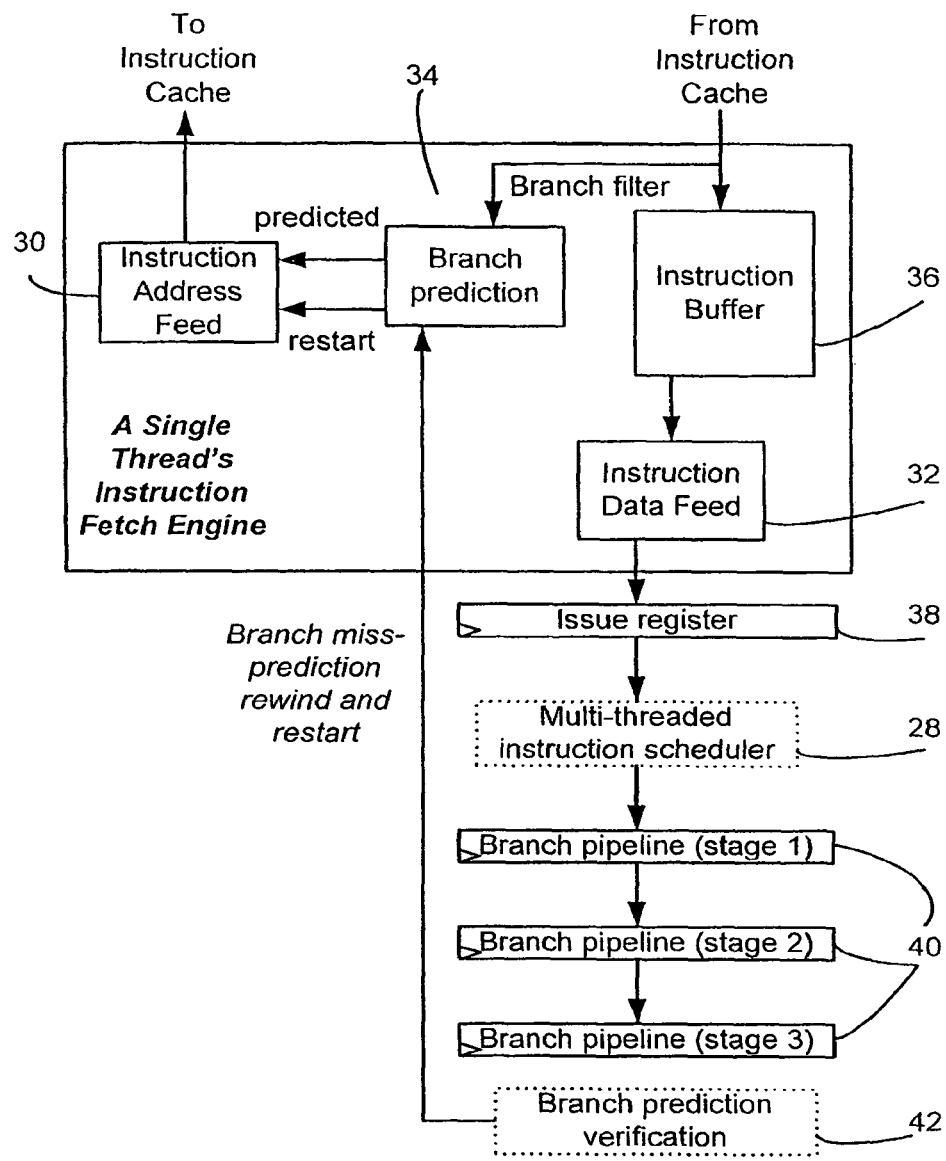
FIG. 4 illustrates a system for speculative instruction fetch and execution in accordance with the present invention.

FIG. 4 shows the same features of a fetch system as FIG. 3, but with the difference that speculative instructions are issued. FIG. 4 shows a three stage execution pipeline 40 following the instruction scheduler 28, and additionally a branch prediction verification data path 42 back to branch prediction unit 34. As can be seen from FIG. 4 the evaluation of branch instructions can take several cycles. To avoid stalling for these cycles the thread needs to be able to continue issuing instructions that followed on from the branch. This may be done provided the actions of those instructions can be unwound. As can be seen from FIG. 4, the number of instructions in question is typically fairly short—as shown it would be at most three or four instructions.

In a multi-threaded microprocessor there may well be several threads that have instructions available to be issued on any given cycle. Therefore, it may be better to issue non-speculative instructions from other threads where there is no question of the correctness of the instructions to be issued (in terms of whether they should be issued or not). However, if speculative instructions are never issued there will always be stalls in a thread's instruction stream (exactly as per the arrangement where only the fetch is predicted). The advantage of speculatively issuing instructions is that if good predictions can be made, more useful work can be done with fewer stalls in the instruction stream for if/then decisions.

As such it is beneficial to be able to speculatively execute instructions where possible, provided that issue does not impact on other threads that have other instructions ready to run. One way to do this is to give threads which are speculatively executing the lowest priority. However, this can be hard to achieve in a system with a feedback loop between current instruction issues and future priority levels. An alternative that can be achieved more easily is to mark speculative execution instructions as unsuitable for being the first or principal or lead issuer. This is achieved by not presenting speculatively executed instructions as available instructions to the main instruction scheduler—instead the threads may mark themselves as interlocked or unavailable at this stage.

In parallel with the choice of the highest priority thread with an instruction that is ready to run, the decision has to be made as to what other threads might be allowed to issue at the same time as this one. This can be calculated for all of the threads on every cycle, as there are fewer gates involved when compared to working out a full set of load-balancing metrics. The gates required test a thread's stated resources against all of the other threads in the system, giving a list of other threads that this thread's instruction is compatible with. This information can then be combined with the pre-prepared thread priority ordering into an absolute list of which threads would issue with this thread if it wins the initial scheduling decision.

Figure 5:
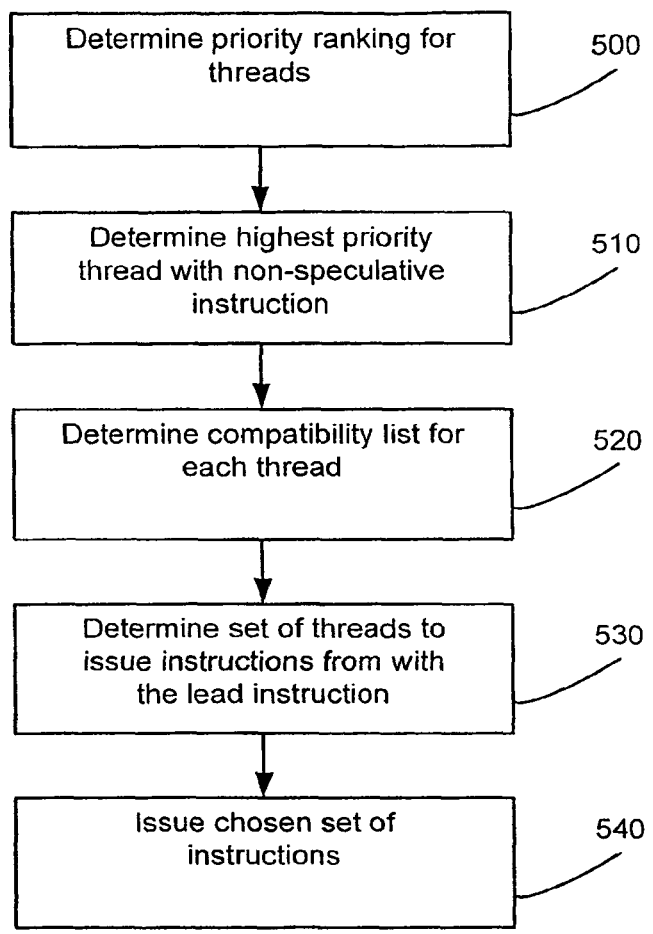
FIG. 5 illustrates the process steps taken to schedule the issue of instructions in accordance with an aspect of the invention.

FIG. 5 illustrates the steps taken in determining which instructions to use, in accordance with an aspect of the invention. At step 500 a priority ranking is determined for each of the threads having available instructions. At this stage threads that are prevented from issuing an instruction owing to resource or register interlocks are removed from consideration. Threads having speculative instructions mark themselves as ineligible for consideration at this stage as well. At step 510 the highest priority thread able to issue an instruction is selected. The instruction issued from this thread is referred to as the lead instruction. As stated, this lead instruction cannot be a speculative instruction. At step 520, a list of compatible threads is compiled for each thread with an available instruction. From these lists and the priority ranking, a set of instructions for issue with the lead instruction is determined, at step 530. At step 540, the instruction set is issued by the instruction scheduler.

Therefore, the invention provides a simple means by which a thread can take itself out of the normal instruction scheduling rules when speculatively executing instructions, while still maintaining the possibility of improved throughput due to being able to issue instructions where previously the scheduler would have had to stall while it waited for a branch outcome to be determined. This solution uses few additional gates and as a result does not have a negative impact on the clock speed that can be achieved for a given multi-threaded microprocessor design.

What is claimed is:

1. A method for dynamically determining which instructions from a plurality of available instructions to issue in a clock cycle of a multithreaded processor capable of executing a plurality of instructions in each clock cycle, the method comprising the steps of:

determining a highest priority non-speculative instruction from the plurality of available instructions comprises determining a highest priority thread that is able to issue an instruction and selecting the instruction from that thread as the highest priority non-speculative instruction, wherein the highest priority non-speculative instruction cannot be an instruction that may not be necessary because an outcome of an earlier program instruction is not yet known; and issuing the highest priority non-speculative instruction together with other compatible available instructions in said clock cycle, to be executed by said multithreaded processor.

2. The method according to claim 1, further comprising the step of marking speculative instructions, or threads with speculative instructions, as unavailable for the step of determining a highest priority non-speculative instruction.

3. The method of claim 2, wherein threads with speculative instructions mark themselves as unavailable for determining a highest priority non-speculative instruction.

4. The method according to claim 1, further comprising the step of determining a priority ranking for the plurality of available instructions, wherein compatible instructions are issued with the highest priority non-speculative instruction in order of priority ranking.

5. The method according to claim 4, wherein the step of determining a priority ranking for the plurality of available instructions comprises the step of determining a priority ranking for each thread having an available instruction.

6. The method according to claim 1, further comprising the step of determining a list of compatible or incompatible instructions for each of the available instructions.

7. The method according to claim 6, wherein an instruction decode unit performs pre-decode of each instruction and determines instruction compatibility as a function of the pre-decode.

8. The method according to claim 7, wherein the instruction decode unit compares resources needed for each available instruction against resources determined in parallel for all other threads active in the processor.

9. The method according to claim 8, wherein the instruction decode unit performs said comparison on every clock cycle.

10. The method according to claim 9, wherein the instruction decode unit performs said comparison for all active threads on every clock cycle.

* * * * *